United States Patent Office 2,814,382
Patented Nov. 26, 1957

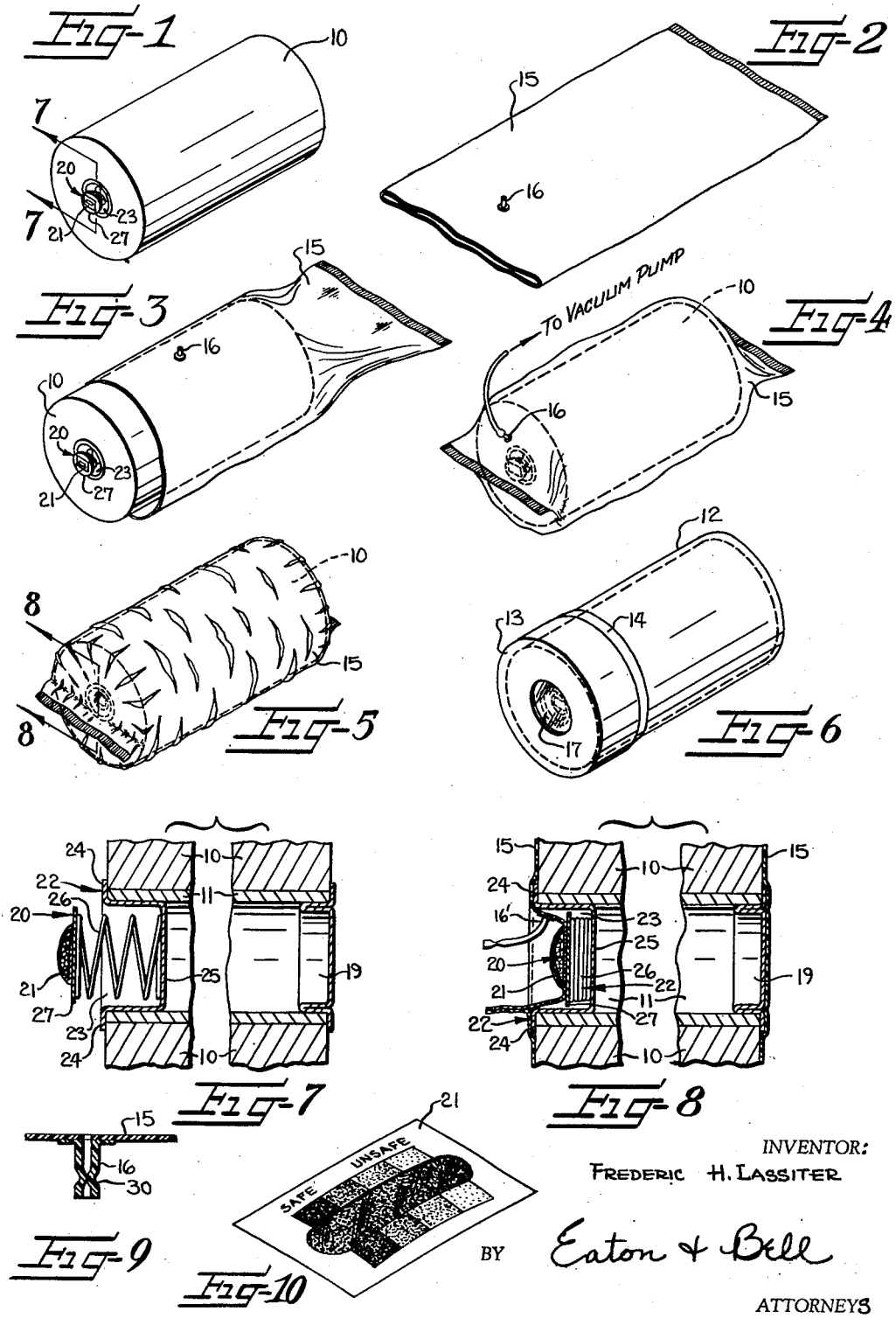

2,814,382

CELLOPHANE PACKAGING AND METHOD

Frederic H. Lassiter, Roaring Gap, N. C.

Application September 21, 1955, Serial No. 535,667

5 Claims. (Cl. 206—46)

This invention relates to the art of packaging cellophane and more particularly to the packaging of cellophane in bulk quantities in such a manner as to maintain stability and to insure against deterioration of the cellophane for an indefinite period of time so long as the package remains intact.

There are two types of cellophane generally identified in the trade as plain transparent cellophane and moisture proof cellophane. Both types of cellophane contain approximately six and one-half percent by weight of moisture at the time of their manufacture and are relatively stable so long as this equilibrium is maintained. As a practical matter, both types of cellophane are usable so long as the moisture content does not fall below four percent nor exceed ten percent of the total weight of a given amount of cellophane.

However, plain transparent cellophane is a highly unstable product since it is neither moisture proof nor water proof but is a highly hygroscopic substance which readily absorbs moisture from a relatively humid atmosphere and just as readily gives up or loses moisture in a relatively dry atmosphere. This characteristic vitally affects the stability of cellophane since when its moisture content is too low, it becomes brittle and breaks easily, sometimes rendering it totally unusable. When its equilibrium is upset because of excessive moisture content it becomes stretchy and difficult to manage, particularly when being processed by automatic machinery as in the formation of cellophane bags, envelopes and the like.

The so-called moisture proof cellophane is formed by coating either one or both sides of plain transparent cellophane with a clear heat-sealable or thermoplastic coating. The type of coating varies in accordance with the use for which the cellophane is intended but virtually all thermoplastic coatings used in making so-called moisture proof cellophane afford some protection to the plain transparent cellophane in that the coating lessens the extent to which the hygroscopic plain transparent cellophane is exposed to the atmosphere.

However, so-called moisture proof cellophane is not truly moisture proof because the clear heat-sealable coating invariably has numerous tiny pin holes through which moisture is free to pass to and from the hygroscopic plain transparent cellophane. Also, the edges of the hygroscopic cellophane are totally unprotected from the atmosphere because so-called moisture proof cellophane is manufactured in large sheets and subsequently cut in desired widths. The heat-sealable coating which extends across the flat surface of the plain transparent cellophane thus does not extend over the edges leaving them exposed to the atmosphere.

Although so-called moisture proof cellophane is water proof in that it will hold water, it is not moisture proof since the pin holes therethrough result in so-called moisture proof cellophane having a relatively high moisture vapor transmission as compared, for example, to Pliofilm, which has a very low moisture vapor transmission.

Wherever the term "cellophane" is used herein it refers to both plain transparent cellophane and the so-called moisture proof cellophane unless otherwise indicated.

Another undesirable characteristic of cellophane is that exposure to repeated variations in humidity renders the surface tacky. Cellophane contains a plasticizer which is isolated from the surface at the time of its manufacture, but which is subject to being washed to the surface to render it tacky or sticky by the repeated flow of moisture into and out of the hygroscopic cellophane. Tackiness sometimes occurs to such an extent as to cause adjacent layers of cellophane to become inseparable which may result in the loss of great quantities of otherwise usable cellophane.

The tendency of cellophane to absorb moisture from a relatively humid atmosphere is increased when humidity is accompanied by heat, and heat likewise increases the tendency of cellophane to give up moisture to a relatively dry atmosphere. The stability of cellophane is also adversely affected by extreme temperature conditions. For example, cellophane which has been frozen cannot be salvaged and restored to usable condition.

In addition to these undesirable features, aging of cellophane often results in its tendency to develop a "blush" or decrease in transparency, which is encouraged by changes in humidity and temperature.

During the manufacture of cellophane, conditions are carefully controlled to obtain the desired moisture content and hence stability. Generally, rolls of freshly manufactured cellophane are wrapped in paper and placed in cardboard tubes for shipment. After leaving the carefully controlled, air conditioned manufacturing plant the rolls of cellophane are, of course, subjected to extreme changes in temperature and humidity since no precautions are taken to control the temperature and humidity during the transportation and storage of the cellophane prior to its ultimate use. For this reason, the manufacturers of cellophane will not guarantee the quality or usability of the cellophane for more than ninety days from the time of its manufacture.

The result is that the unstable nature of cellophane presents a problem both to the converter and the ultimate user with respect to inventory and to the handling of the cellophane during such converting operations as printing and the formation of cellophane into packages for other products. The inventory problem is created by virtue of the fact that the unstable nature of cellophane renders it necessary for the converters and ultimate users of cellophane to purchase it in relatively small quantities which increases the cost per pound of the cellophane.

In order to overcome these and other objections, it is the primary object of this invention to provide method and means for preserving and maintaining the stability of cellophane. It is another object of this invention to provide a novel package for bulk quantities of cellophane and a novel method of packaging cellophane to prevent deterioration thereof.

It is more specifically an object of this invention to provide a package which will preserve the optimum equilibrium of the cellophane of approximately six and one-half percent moisture content by encasing the cellophane in a predetermined atmosphere.

It is another object of this invention to package cellophane in a vacuum in order to maintain stability. As previously noted, the presence of heat increases the hygroscopic action of cellophane and according to well-known vacuum principles the creation of a vacuum about a quantity of cellophane will not only maintain the cellophane in a predetermined atmosphere but will also protect the cellophane from extreme temperatures. Thus, the packaging of cellophane in vacuum will not only maintain the moisture content at an optimum point, but will protect the cellophane from freezing. In accordance with this invention, the stability of cellophane may best be maintained by packaging it in a vacuum.

It is another object of this invention to provide means for achieving a desired atmosphere within the enclosure of the present invention by varying the relative humidity therein so as to compensate for the gain or loss of moisture from the cellophane. The addition of moisture to the cellophane must be carefully controlled as an excess of water will result in the cellophane becoming limp and stretchy. By means of the present invention the quantity of moisture in the cellophane can be rigidly controlled.

It is another object of this invention to provide visual means for determining the humidity within the package of this invention. It is, of course, understood that so long as the package remains intact, the equilibrium of the cellophane can be maintained indefinitely thereby eliminating the problems of handling and of inventory which result from purchasing in small quantities. However, it is foreseeable that the package of the present invention may for various reasons become ruptured such as in transit or otherwise and the cellophane subjected to possibly unfavorable atmospheric conditions, thereby endangering the stability of the cellophane. For this reason it is desirable to provide a visual indicator which will readily indicate the condition of the atmosphere immediately surrounding the cellophane without opening the package. The visual indicators in each of a number of stored rolls or packages may be periodically checked and if it appears from the indicator that the atmosphere surrounding the cellophane is of such a nature as to upset the equilibrium, the package may be opened and the cellophane used at once before it has a chance to deteriorate to a point where it is no longer usable.

It is still another object of this invention to provide a visual indicator for use in conjunction with a vacuum package for determining without opening the package whether the vacuum has been broken and the cellophane within the package thereby subjected to the atmosphere.

According to this invention, cellophane in roll or sheet form is placed within an air-tight bag provided with a valve and the cellophane and bag are then inserted in a substantially conventional rigid shipping tube or container. Before ultimately sealing the valve in the air-tight bag, moisture is added to or withdrawn from the cellophane as may be desired, and the air is then quickly evacuated from the air-tight bag for shipment or indefinite storage.

Some of the objects of the invention having been stated, other objects will appear as the description proceeds when taken in connection with the accompanying drawings, in which—

Figure 1 is an isometric view of a roll of unpackaged cellophane having a visual humidity and vacuum indicator positioned in its core;

Figure 2 is an isometric view of the bag or container of the present invention as it appears before being placed about the roll of cellophane shown in Figure 1;

Figure 3 is an isometric view showing the roll of Figure 1 partially inserted within the bag of Figure 2;

Figure 4 is an isometric view of the bag of Figure 2 sealed about a roll of cellophane and attached to a vacuum pump;

Figure 5 is an isometric view showing the manner in which the bag of Figure 2 conforms to the contour of the roll of cellophane after the bag has been evacuated;

Figure 6 is an isometric view of a shipping tube in which the roll of cellophane and bag of Figure 5 is packaged for shipping;

Figure 7 is a transverse vertical sectional view taken along the line 7—7 in Figure 1 illustrating the manner in which the cores of the roll of cellophane are sealed and also illustrating the position the visual vacuum indicator assumes in its relaxed state;

Figure 8 is a view similar to Figure 7 but taken along the line 8—8 in Figure 5 and showing the position which the visual vacuum indicator assumes when the bag is evacuated;

Figure 9 is an enlarged sectional view of the valve of Figure 2 showing the manner in which the valve is sealed to render the same air-tight;

Figure 10 is an enlarged isometric view of the visual humidity indicator which may also be seen in Figures 1, 3, 4, 6, 7 and 8.

Referring more specifically to the drawings, the numeral 10 indicates a roll of freshly manufactured cellophane which has been rolled upon a cardboard core 11 for convenience in shipping.

For shipping purposes it has heretofore been the practice to wrap the roll 10 in paper such as kraft paper and then to place the wrapper roll within a shipping tube 12 having a removable cover 13 suitably sealed as by an adhesive strip 14 to the main body portion of the shipping tube.

According to the present invention cellophane is packaged to insure against deterioration resulting from changes in humidity and temperature and to this end there is provided an air-tight bag or container such as indicated at 15 in Figure 2 and which may be used with the conventional shipping tube and cap.

The bag 15 may be formed of any desired material which is air-tight such as plastic, kraft paper which has been laminated with aluminum, or metal. If a non-transparent material is used, such material should be provided with a window adjacent one end of the package for purposes to be later described.

Preferably the bag 15 is formed of transparent sheet material such as vinylidene chloride (Saran), rubber hydrochloride (Pliofilm), polyvinyl chloride, or laminated cellophane, which may be readily fabricated to form a bag having one end sealed as by heat sealing and the other end open, prior to enveloping the cellophane roll 10 therein.

The first step in protecting a freshly manufactured roll of cellophane 10 is to place the roll of cellophane in the bag 15 in the manner indicated in Figures 3 and 4, it being noted in Figure 4 that the previously open end of the bag 15 is closed as by heat sealing. If it is desired to package more than one roll of cellophane in one bag, the rolls may be placed end to end and this assembly wrapped with cardboard or other suitable material to support the bag 15.

The bag 15 is preferably provided with a valve 16 for attachment to a vacuum pump whereby the flexible bag 15 may be evacuated to cause it to conform to the configuration of the roll 10 as shown in Figure 5. In packaging freshly manufactured cellophane which contains an optimum amount of moisture of between four and ten percent by weight, the bag 15 is swiftly evacuated by pulling a quick vacuum of approximately twenty-seven to twenty-eight inches of mercury at room temperature. The vacuum is pulled swiftly in order to prevent the moisture in the cellophane from being boiled away. The evacuated bag and roll therein as shown in Figure 5 are then placed within the shipping tube 12 as shown in Figure 6 to protect the bag 15 against rupture.

The cover 13 is provided with a window 17 therein through which the adjacent ends of the transparent bag 15 and the cellophane roll 10 may be observed in order to determine the condition of the atmosphere within the bag 15. This is made possible by means of a tell-tale 20 including a visual humidity indicator 21 and a visual vacuum indicator 22 which has been positioned in one end of the core 11 of the roll 10, prior to the insertion of the roll in the bag 15. The other end of the core 11 is also closed by a suitable plug 19 prior to the roll 10 being sealed within bag 15, the indicator 20 and plug 19 serving to prevent the bag 15 from being sucked into the core when the bag is evacuated.

The visual humidity indicator 21 comprises crystals of a substance commonly known as silica gel disposed within a transparent envelope to which is attached a color legend, as shown in Figure 10. The color of the silica gel crystals within the transparent container is affected by changes in the humidity surrounding the visual humidity indicator. For example, when the relative humidity is quite low, the color is dark and as the relative humidity increases, the color of the crystals becomes increasingly lighter. Thus, so long as the color of the chemical indicator remains a deep, dark shade, it may be ascertained by visual inspection that the atmosphere immediately surrounding the indicator is relatively free of humidity.

The tell-tale 20 also includes a vacuum indicator 22 for indicating the presence or absence of a vacuum within the bag 15, said vacuum indicator comprising a cup-like member 23 provided with a peripheral flange 24 at one end. The cup-like member 23 is adapted to fit within the core 11 so that the flange 24 engages the edge of the core and the other end 25 of the member 23 is positioned within the core 11. A spring 26 is secured at one end to the innermost portion or end 25 of the vacuum indicator 22, the other end of the spring 26 being attached to a disk 27 which is movable relative to the end 25 and is normally urged away therefrom by spring 26. In the absence of a vacuum or other restraining means, the disk 27 is normally positioned outwardly beyond the edge of the roll 10 as shown in Figure 7 but upon the bag 15 being evacuated to create a vacuum therein, the disk 27 will move inwardly toward the end 25 as shown in Figure 8. The disk 27 is preferably painted a bright color so its position relative to the adjacent edge of the roll 10 may be readily determined at a glance to in turn indicate the presence or absence of a vacuum within the bag 15. Of course, the spring 26 may be made a desired strength to render movement of the tell-tale disk 27 responsive to predetermined variations in the amount of vacuum.

The visual humidity indicator 21 is preferably secured to the outer surface of the disk 27 so as to provide an integral tell-tale device for determining atmospheric conditions within the bag 15. When the tell-tale 20 is positioned adjacent the window 17 in the tube 12, it is apparent that the condition of the bag 15 and the atmosphere therein may be readily determined.

Cellophane is manufactured with a water content of approximately six and one-half to seven per cent by weight and so long as equilibrium of this water content is maintained, the cellophane will remain in a usable condition for an indefinite period. The best way to accomplish this is to package the cellophane in a vacuum but some of the advantages which are obtainable by such a packaging may also be obtained by packaging the cellophane in an air-tight container. The package of the present invention may be utilized for an air-tight container rather than a vacuum package by merely crimping the valve as at 30 in Figure 9 after the bag 15 has been heat sealed about the roll 10.

It frequently happens that cellophane passes through several steps after it leaves the manufacturer and before it is finally utilized by the ultimate consumer, each of which necessitates the cellophane being removed from the bag 15 and subjected to varying atmosphere conditions. For example, the cellophane may go from the manufacturer to a converter who prints the rolls of cellophane and from there to another converter who slits the rolls of cellophane into strips of suitable width.

The printing of cellophane by automatic printing machinery removes or takes away from the cellophane approximately three percent of its moisture content. Also, it frequently happens during the processing of cellophane by converters that its equilibrium is upset by the addition of moisture to the cellophane as by prolonged exposure to a highly humid atmosphere. As heretofore stated, either of these situations hastens deterioration of the cellophane to a point where it may become unusable by the ultimate consumer.

It has long been standard practice in the industry for converters, after processing, to re-pack the cellophane in the same tube or container 12 in which the cellophane was originally packed for subsequent shipping and storage. It is contemplated that the substantially conventional tube 12 will continue to be so used and this invention provides a novel method and means in combination therewith for restoring an optimum moisture content to cellophane during re-packaging by converters.

A converter may determine the actual moisture content of a given quantity of cellophane by an ohmmeter or it may be determined by weighing since it is known that the optimum moisture content of cellophane is six and one-half percent by weight and it is apparent that the weight of the moisture in one hundred pounds of cellophane containing optimum moisture is six and one-half pounds. Cellophane is usually shipped from the manufacturer in one hundred pound rolls and if after processing, such as printing, the weight of the quantity received is, for example, only ninety-seven pounds, it is clear that the moisture content has been reduced to a dangerously low point and that three pounds of water must be restored to the cellophane to return it to its optimum equilibrium.

This may be accomplished by placing three pounds of water within either a permeable container or an impermeable container provided with a wick in the hollow core 11 prior to closing the core with the members 21 and 23. The roll 10 is then quickly sealed in the bag 15 and placed in the tube 12 to minimize the likelihood of the cellophane picking up additional moisture from the surrounding atmosphere. The required amount of water will be readily absorbed by the hygroscopic cellophane.

The same result may be more quickly obtained by sealing the dehydrated cellophane in the bag 15, omitting the permeable or impermeable container of water from the core 11, and providing the bag 15 with an elongated valve 16' such as indicated in Figure 8. The bag 15, sealed about the roll of dehydrated cellophane, is then disposed in the tube 12 which is provided with an aperture in the window 17 to accommodate the elongated valve 16' which extends outwardly beyond the tube 12. The tube 12 is then sealed as if for shipping by the adhesive strip 14 and the required amount of moisture is introduced under pressure into the bag 15 by means of a commercial atomizer attached to the free end of the valve 16'. If desired, a swift vacuum may be pulled in the bag 15 before introducing moisture under pressure to more accurately control the humidity within the bag 15.

The reason for adding the moisture under pressure is to increase the rate at which the hygroscopic cellophane absorbs the water to restore it to optimum equilibrium. By first placing the bag in the tube 12 before introducing moisture under pressure into the bag, the tube 12 serves as a reinforcement to permit greater pressure to be introduced into the bag than would otherwise be possible. In other words, the bag 15 and tube 12 have much the same relationship as an innertube and a tire casing wherin the casing protects the innertube and permits additional pressure to be introduced therein.

After sufficient moisture has been added, the pressure is relieved from the bag through the valve 16' and a swift vacuum may be pulled prior to closing the valve 16', or, if desired, the valve 16' may be closed in an air-tight manner after relieving the pressure without creating a vacuum in the bag.

It has heretofore been noted that cellophane is subject to deterioration through freezing and if desired a suitable amount of liquid anti-freeze solution such as, for example, one-half pound of tri-ethylene glycol may be introduced into the bag 15 together with whatever additional moisture is necessary to restore the optimum equilibrium. If a vacuum is to be created in the bag 15 after the equilibrium has been restored it is not essential to add any anti-freeze solution since the vacuum sufficiently protects the cellophane from freezing according to well-known vacuum principles.

If it is contemplated that a vacuum will be pulled and the anti-freeze solution omitted, it is preferable to wrap the roll of cellophane in corrugated cardboard before sealing it in the bag 15. Thus, when the bag 15 is subsequently evacuated, the corrugated cardboard will provide a certain amount of air space between the bag 15 and the roll 10 which air space has great insulating qualities.

If, during processing it is determined that the cellophane has become saturated and that it is necessary to take water from the cellophane in order to reach the optimum moisture content, the saturated cellophane may be weighed and a slow vacuum pulled in the bag 15 to cause the excess moisture within the cellophane to boil and pass out of the bag with the air being evacuated. For example, if it has been predetermined that a quantity of cellophane containing optimum moisture content weighs one hnudred pounds and that quantity indicated by an ohmmeter to be saturated weighs one hundred and three pounds, the saturated cellophane may be subjected to a slow vacuum to boil away sufficient moisture to reduce the weight to one hundred pounds.

Various other methods may be utilized for adding or taking moisture from the cellophane in order to achieve an optimum equilibrium wtihout departing from the scope of the invention. For example, either saturated or dehydrated cellophane may be placed in a pressure chamber rather than in the bag 15 and moisture under pressure introduced into the chamber or a slow vacuum pulled therefrom to achieve the desired equilibrium. The cellophane may then be packaged in the manner herein set forth to maintain said equilibrium indefinitely.

It should be readily recognized that the purpose of the various procedures of adding moisture and/or anti-freeze to the cellophane and removing moisture from the cellophane is to achieve and maintain an optimum equilibrium and to prolong the usability of the cellophane for an indefinite period by isolating it from varying conditions of temperature and humidity. Other advantages will be obvious to those skilled in the art.

In the drawings and specification there has been set forth a preferred embodiment of the invention and although specific terms are employed, they are used in a generic and descriptive sense only, and not for purposes of limitation, the scope of the invention being defined in the claims.

I claim:

1. A method of reducing the moisture content of saturated cellophane to an optimum equilibrium and maintaining said equilibrium to indefinitely prolong the stability of the cellophane and to correspondingly reduce the weight of the cellophane to a predetermined optimum weight which comprises providing an impervious container for the cellophane, weighing the container, weighing the saturated cellophane, sealing the container about the cellophane, communicatively connecting the interior of the container to a vacuum pump, slowly evacuating the air from the interior of the container to draw moisture from the cellophane and the container until the weight of the container and cellophane exceed said optimum weight by only the weight of the container, and sealing the container to maintain the vacuum therein.

2. A method of increasing the moisture content of dehydrated cellophane to a predetermined optimum equilibrium and maintaining said equilibrium to indefinitely prolong the stability of the cellophane which comprises providing an impervious container for the cellophane, determining the actual moisture content of the dehydrated cellophane, placing the cellophane in the container, placing water in a receptacle within the container, the amount of water being equal to the difference between the optimum equilibrium and the actual moisture content of the cellophane, sealing the container in an air-tight manner, introducing air under pressure to the interior of the container to increase the rate of absorption of the water by the cellophane, allowing the air to remain in the container until the water is dissipated from the receptacle, rapidly evacuating air from the container to create a vacuum therein, and sealing the container to maintain the vacuum.

3. A method of packaging cellophane within an optimum atmosphere for preserving the longevity of the cellophane for an indefinite period comprising placing a predetermined amount of moisture in a permeable container adjacent the cellophane, sealing the cellophane and the permeable container in an air-tight enclosure, and rapidly evacuating said air-tight enclosure.

4. In combination with a moisture proof package for unstable products having a transparent impervious flexible bag sealed about the contents of the package and evacuated and disposed within a rigid sealed shipping case, means for determining the presence and humidity of atmospheric pressure within the flexible bag without opening the shipping case, said means comprising a window formed in one end of the shipping case, a mechanical vacuum indicator disposed within said bag adjacent the window in the shipping case, said mechanical vacuum indicator comprising a base and a movable member, said base being supported by the contents of the bag and the movable member being spaced from the base in engagement with the flexible bag, a resilient member extending between the base and the movable member and being yieldable to inward movement of the flexible bag against the movable member under vacuum pressure to position the movable member adjacent the base, said movable member being movable by the resilient member away from the base upon atmospheric pressure being introduced into the bag to indicate the absence of a vacuum in the bag, and a chemical humidity indicator secured to the surface of the movable member remote from the base.

5. A method of increasing the moisture content of dehydrated cellophane to a predetermined optimum equilibrium and maintaining said equilibrium to indefinitely prolong the stability of the cellophane which comprises determining the actual moisture content of the dehydrated cellophane, sealing the dehydrated cellophane in a flexible impervious container provided with an elongated valve, sealing the impervious flexible container with the cellophane therein in a rigid snugly fitting reinforcing member, connecting the valve to an atomizer, introducing moisture under pressure into the interior of the flexible impervious container in sufficient quantity to compensate for the amount of dehydration, relieving the pressure from the flexible impervious container, rapidly evacuating the flexible impervious container, and sealing the valve to maintain the vacuum.

References Cited in the file of this patent

UNITED STATES PATENTS

| 1,458,585 | McCrosson | June 12, 1923 |
| 1,705,849 | Barber | Mar. 19, 1929 |
| 1,843,234 | Karnes et al. | Feb. 2, 1932 |
| 2,164,505 | Edwards | July 4, 1939 |
| 2,225,774 | Flosdorf | Dec. 24, 1940 |
| 2,316,607 | MacDonald | Apr. 13, 1943 |
| 2,424,553 | Conti | July 29, 1947 |
| 2,446,361 | Clibbon | Aug. 3, 1948 |
| 2,576,650 | Sonnenberg | Nov. 27, 1951 |
| 2,611,481 | Sargeant et al. | Sept. 23, 1952 |
| 2,613,487 | Vaughn | Oct. 14, 1952 |
| 2,624,500 | Merrill et al. | Jan. 6, 1953 |
| 2,638,263 | Jesnig | May 12, 1953 |
| 2,725,142 | Davis | Nov. 29, 1955 |

FOREIGN PATENTS

| 663,519 | Great Britain | Dec. 27, 1951 |